United States Patent
Nunomura et al.

(10) Patent No.: US 10,452,856 B2
(45) Date of Patent: Oct. 22, 2019

(54) PROCESSING APPARATUS, CONTROLLER AND PROCESSING SYSTEM

(71) Applicant: HITACHI KOKUSAI ELECTRIC INC., Tokyo (JP)

(72) Inventors: Ichiro Nunomura, Toyama (JP); Satoru Takahata, Toyama (JP); Hiroyuki Iwakura, Toyama (JP)

(73) Assignee: KOKUSAI ELECTRIC CORPORATION, Tokyo (JP)

( * ) Notice: Subject to any disclaimer, the term of this patent is extended or adjusted under 35 U.S.C. 154(b) by 267 days.

(21) Appl. No.: 15/460,603

(22) Filed: Mar. 16, 2017

(65) Prior Publication Data
US 2017/0193243 A1    Jul. 6, 2017

Related U.S. Application Data

(63) Continuation of application No. PCT/JP2014/075644, filed on Sep. 26, 2014.

(51) Int. Cl.
*H04L 29/06* (2006.01)
*G06F 21/62* (2013.01)
(Continued)

(52) U.S. Cl.
CPC ............ *G06F 21/6209* (2013.01); *G06F 8/61* (2013.01); *G06F 21/30* (2013.01); *G06F 21/31* (2013.01);
(Continued)

(58) Field of Classification Search
CPC .................................................. G06F 21/6209
See application file for complete search history.

(56) References Cited

U.S. PATENT DOCUMENTS

2001/0045458 A1* 11/2001 Polansky ............... G06K 19/10
235/382
2002/0097436 A1* 7/2002 Yokoyama ............ H04N 1/622
358/2.1
(Continued)

FOREIGN PATENT DOCUMENTS

JP    2005-347867 A    12/2005
JP    2006-093494 A    4/2006
(Continued)

OTHER PUBLICATIONS

Korean Office Action dated Aug. 24, 2018 for the Korean Patent Application No. 10-2017-7004422.
(Continued)

*Primary Examiner* — Shawnchoy Rahman
(74) *Attorney, Agent, or Firm* — Volpe and Koenig, P.C.

(57) ABSTRACT

Described herein is a technique that may prevent unauthorized personnel from editing files without permission. A processing apparatus may include: an operating unit configured to display an operation screen for editing an integrated file containing: non-encrypted data corresponding to an item file; a drawing file; and encrypted data obtained by encrypting the item file; a memory unit configured to store the integrated file; and an arithmetic unit configured to: (a) compare the item file with data obtained by decrypting the encrypted data; and (b) combine and display the item file and the drawing file on the operation screen according to a result of comparison performed in (a).

15 Claims, 10 Drawing Sheets

(51) Int. Cl.
*G06F 21/60* (2013.01)
*G06F 8/61* (2018.01)
*G06F 21/30* (2013.01)
*G06T 11/20* (2006.01)
*G06T 11/60* (2006.01)
*G06F 21/31* (2013.01)
*G06F 8/33* (2018.01)
*G06F 8/36* (2018.01)

(52) U.S. Cl.
CPC ............ *G06F 21/60* (2013.01); *G06T 11/206* (2013.01); *G06T 11/60* (2013.01); *G06F 8/33* (2013.01); *G06F 8/36* (2013.01); *G06T 2200/24* (2013.01)

(56) References Cited

U.S. PATENT DOCUMENTS

| | | | |
|---|---|---|---|
| 2002/0103759 A1* | 8/2002 | Matsumoto | G06F 21/10 705/51 |
| 2002/0184494 A1* | 12/2002 | Awadalla | G06F 21/606 713/160 |
| 2004/0003119 A1* | 1/2004 | Munir | G06F 8/33 709/246 |
| 2008/0178119 A1 | 7/2008 | Nogami et al. | |
| 2011/0154063 A1* | 6/2011 | Tani | G06F 21/602 713/193 |
| 2011/0208777 A1* | 8/2011 | Kang | G06Q 10/06 707/769 |
| 2014/0058551 A1 | 2/2014 | Morinaga et al. | |

FOREIGN PATENT DOCUMENTS

| | | |
|---|---|---|
| JP | 2008-112968 A | 5/2008 |
| JP | 2014-041976 A | 3/2014 |

OTHER PUBLICATIONS

Chinese Office Action dated Oct. 24, 2018 for the Chinese Patent Application No. 201480081361.1.

\* cited by examiner

US 10,452,856 B2

PROCESSING APPARATUS, CONTROLLER AND PROCESSING SYSTEM

CROSS-REFERENCE TO RELATED PATENT APPLICATION

This non-provisional U.S. patent application claims priority under 35 U.S.C. § 119 of International Patent Application No. PCT/JP2014/075644, filed on Sep. 26, 2014, in WIPO, the entire contents of which are hereby incorporated by reference.

BACKGROUND

1. Field

The present disclosure relates to managing an integrated file used in a processing apparatus that processes an object to be processed.

2. Description of the Related Art

Substrate processing wherein substrates are processed based on recipe (process recipe) defining processing conditions and processing sequences, is employed to fabricate devices such as DRAMs and ICs using processing apparatus such as substrate processing apparatuses that process conventional substrates. The components of the substrate processing apparatus used in the substrate processing are controlled by the control unit.

The process recipe includes a plurality of steps. Each of the plurality of steps is created by an editing operation that modifies the data through the operation screen (recipe editing screen). After the process recipe is edited, a gas flow pattern diagram indicating the supply status and the exhaust status of a process gas may be displayed on the operation screen. By displaying the gas flow pattern diagram, you may easily check the edited content of the process recipe. According to the prior art, in order to prevent unauthorized personnel from editing the recipe, the logout process and the screen change process are performed when no operation is performed through the operation screen for a predetermined time while editing the process recipe. In addition, according to another prior art, the screen may be switched from the recipe editing screen to the gas flow pattern screen to see whether the supply status and the exhaust status of the process gas match the edited content. On the operation screen (gas flow pattern screen), the gas flow pattern diagram of each step is displayed.

Since process recipe is for processing the substrate, the reliability of the substrate processing apparatus as well as the quality of the product substrate is adversely affected when the recipe is arbitrarily edited by an unauthorized personnel. Therefore, it is necessary to maintain the security of the process recipe. Moreover, since creation and editing of an integrated file that contains the gas flow pattern diagrams is mainly performed domestically, no special restrictions or permissions are set for the file.

The creation and the editing of the integrated file that contains the gas flow pattern diagram are performed using a dedicated editing tool. However, if the data editing tool is leaked and used by unauthorized personnel, the integrated file may be tampered with.

SUMMARY

Described herein is a technique that may prevent unauthorized personnel from editing files without permission.

According to one aspect of the technique described herein, a processing apparatus may include: an operating unit configured to display an operation screen for editing an integrated file containing: non-encrypted data corresponding to an item file; a drawing file; and encrypted data obtained by encrypting the item file; a memory unit configured to store the integrated file; and an arithmetic unit configured to: (a) compare the item file with data obtained by decrypting the encrypted data; and (b) combine and display the item file and the drawing file on the operation screen according to a result of comparison performed in (a).

DETAILED DESCRIPTION

<Embodiments>

Hereinafter, Embodiments will be described.

(1) Configuration of Substrate Processing System

Figure 1:
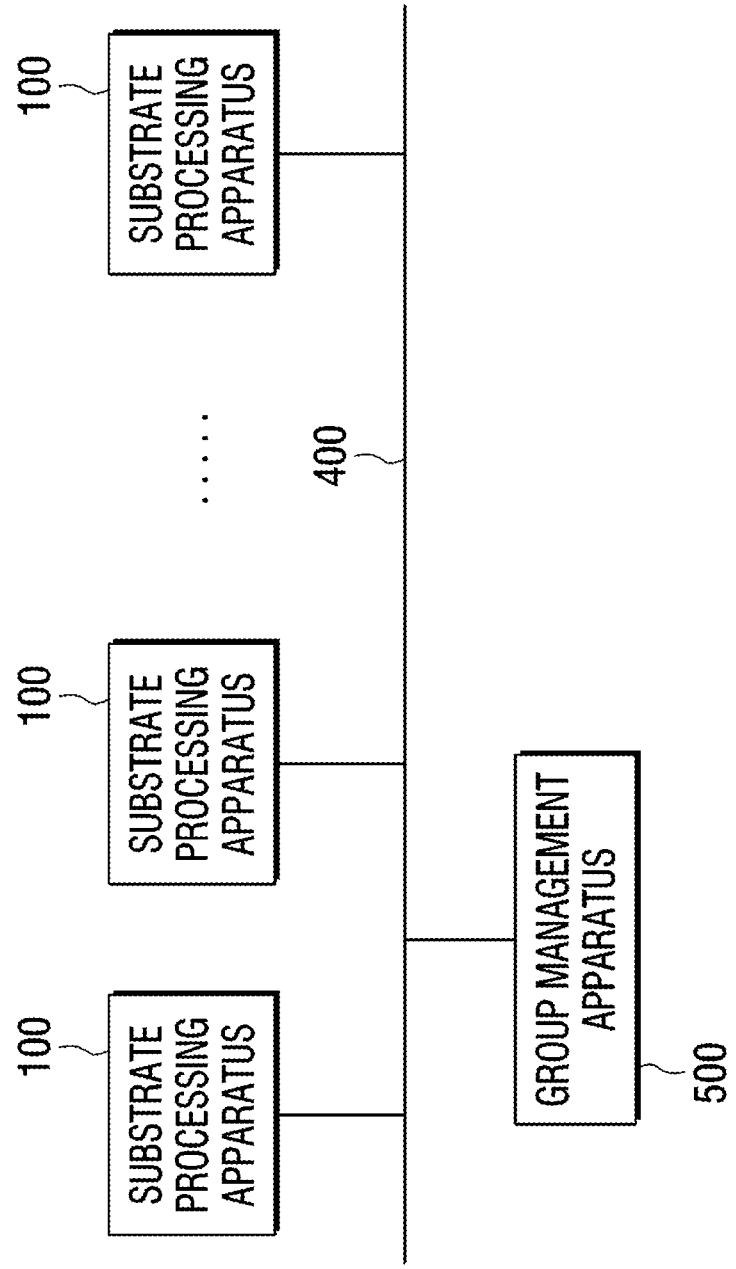
FIG. 1 schematically illustrates a configuration of a substrate processing system according to an embodiment described herein.

First, the configuration of the substrate processing system according to the embodiment will be described with reference to FIG. 1. FIG. 1 schematically illustrates the configuration of the substrate processing system according to the embodiment described herein.

As shown in FIG. 1, the substrate processing system according to the embodiment includes at least one substrate processing apparatus 100 and a group management apparatus 500 connected to each substrate processing apparatus 100 so as to exchange data. The substrate processing apparatus 100 is configured to perform a process based on a recipe defining processing sequences and processing conditions. The substrate processing apparatus 100 and the group management apparatus 500 are connected to a network 400 such as a local region network (LAN) and a wide region network (WAN).

(2) Configuration of the Substrate Processing Apparatus

Figure 2:
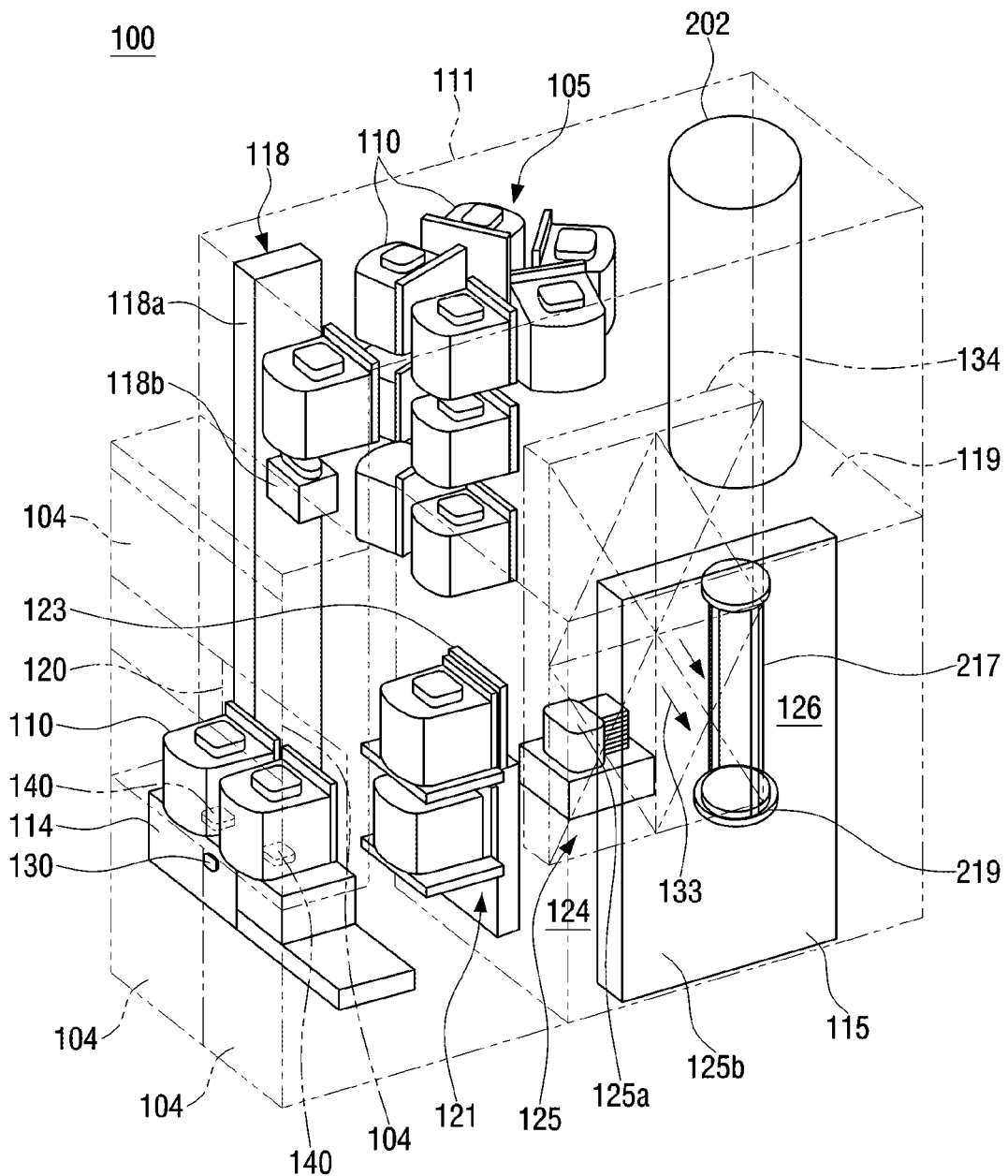
FIG. 2 is a perspective view of a substrate processing apparatus according to an embodiment described herein.
Figure 3:
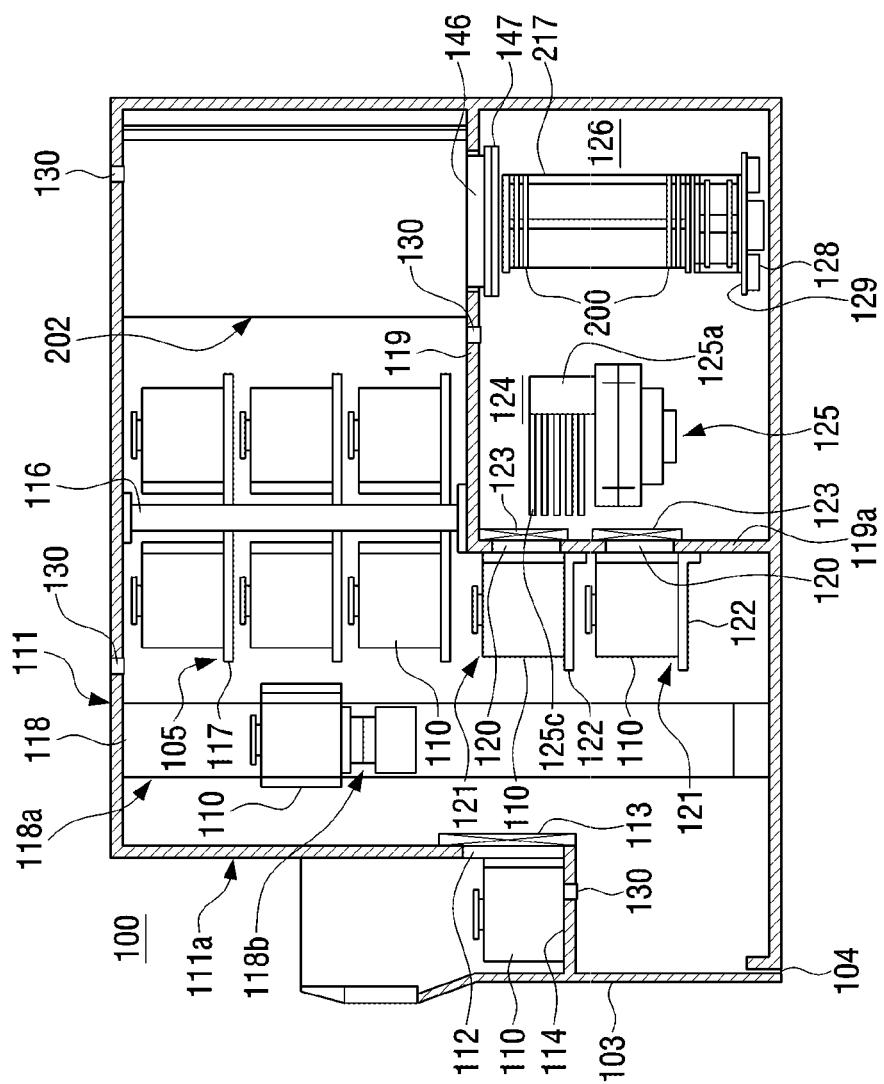
FIG. 3 is a side perspective view of a substrate processing apparatus according to an embodiment described herein.

Next, the configuration of the substrate processing apparatus 100 according to the embodiment will be described with reference to FIGS. 2 and 3. FIG. 2 is a perspective view of the substrate processing apparatus according to the embodiment. FIG. 3 is a side perspective view of the substrate processing apparatus according to the embodiment. The substrate processing apparatus 100 according to the embodiment includes a vertical apparatus for performing processes such as an oxidation process, a diffusion process and a CVD process for a substrate such as a wafer.

As shown in FIGS. 2 and 3, the substrate processing apparatus 100 according to the embodiment includes a housing 111 constituted by a pressure vessel. A front maintenance opening 103 for the maintenance of the substrate processing apparatus 100 is installed in front of a front wall 111a of the housing 111. A pair of front maintenance doors 104, which are access mechanisms for opening and closing the front maintenance opening 103, are installed at the front maintenance opening 103. A pod 110 accommodating a wafer 200 made of a material such as silicon is used as a carrier for loading a wafer 200 into or unloading the wafer 200 from the housing 111.

A pod loading/unloading port 112 for communicating the inside and the outside of the housing 111 is installed on the front wall 111a of the housing 111. The pod loading/unloading port 112 is opened and closed by a front shutter 113 (substrate container loading/unloading port opening and closing mechanism). A substrate container shelf 114, which is a substrate container support, is installed in front of the pod loading/unloading port 112. The loading shelf 114 is configured such that the pod 110 is placed thereon in aligned manner. The pod 110 may be transferred onto the loading shelf 114 by an automated guided vehicle (not shown) such as an Overhead Hoist Transport (OHT).

A rotatable pod shelf 105 (substrate container placement shelf) is installed at the upper portion of the approximately central portion between the front portion and the rear portion of the housing 111. The rotatable pod shelf 105 is configured to store a plurality of pods 110 thereon. The rotatable pod shelf 105 includes a pillar 116 vertically erected and intermittently and horizontally rotated and a plurality of shelf plates 117 (substrate container shelf) radially supported at the upper end of the pillar 116 is provided. The plurality of shelf plates 117 are configured to support a plurality of pods 110 placed thereon.

A substrate transfer apparatus (substrate container transfer apparatus) 118 is disposed between the loading shelf 114 and the rotatable pod shelf 105 in the housing 111. The pod transfer apparatus 118 includes a pod elevator (substrate container elevating mechanism) 118a capable of elevating the pod 110 while supporting the pod 110, and a substrate container transfer mechanism 118b which is a transfer mechanism. The pod transfer apparatus 118 transfers the pod 110 among the loading shelf 114, the rotatable pod shelf 105 and a pod opener 121 by utilizing the pod elevator 118a and the substrate container transfer mechanism 118b.

The sub-housing 119 is installed in a lower portion of the housing 111 from a substantially central portion to the rear portion of the housing 111. A pair of wafer loading/unloading ports 120 for transferring the wafer 200 between the inside and the outside of a sub-housing 119 are disposed on a front wall 119a of the sub-housing 119 vertically in two stages. The pod opener 121 is installed at each of the upper and lower wafer loading/unloading ports 120.

Each pod opener 121 has a pair of placement shelf 122 for placing the pod 110 thereon and a cap detaching mechanism 123 for detaching the cap (lid) of the pod 110. The pod opener 121 is configured to open and close the wafer entrance of the pod 110 by detaching the cap of the pod 110 placed on the placement shelf 122 by the cap detaching mechanism 123.

A transfer chamber 124 isolated from the space in which the pod transfer apparatus 118 and the rotatable pod shelf 105 are installed is provided in the sub-housing 119. A wafer transfer mechanism (substrate transfer mechanism) 125 is installed in the front region of the transfer chamber 124. The wafer transfer mechanism 125 includes a wafer transfer apparatus (substrate transfer apparatus) 125a capable of rotating or moving the wafer horizontally and a wafer transfer apparatus elevator (substrate transfer apparatus elevating mechanism) 125b capable of elevating the wafer transfer apparatus 125a. As shown in FIG. 2, the wafer transfer apparatus elevator 125b is installed between the right end portion of the front region of the transfer chamber 124 of the sub-housing 119 and the right end portion of the housing 111. The wafer transfer apparatus 125a includes a tweezer 125c (substrate support body) for supporting the wafer 200. The wafer transfer apparatus elevator 125b and the wafer transfer apparatus 125a may charge the wafer 200 into a boat (substrate retainer) 217 or to discharge the wafer 200 from the boat 217.

A standby region 126 wherein the boat 217 is in standby position is provided in the rear region of the transfer chamber 124. A processing furnace 202 is installed above the standby region 126. The lower end of the processing furnace 202 is opened and closed by a shutter (furnace opening and closing mechanism) 147.

As shown in FIG. 2, a boat elevator (substrate retainer elevating mechanism) 115 for lifting and lowering the boat 217 is installed between the right end portion of the standby region 126 of the sub-housing 119 and the right end portion of the housing 111. An arm 128, which is a connecting mechanism, is connected to the platform of the boat elevator 115. A seal cap 219 which is a lid is installed horizontally on the arm 128. The seal cap 219 is configured to support the boat 217 vertically and to close the lower end of the processing furnace 202.

The substrate transfer system according to the embodiment includes the rotatable pod shelf 105, the boat elevator 115, the pod transfer apparatus (substrate container transfer apparatus) 118, the wafer transfer mechanism (substrate transfer mechanism) 125, the boat 217 and a rotating mechanism 254 to be described later. The rotatable pod shelf 105, the boat elevator 115, the pod transfer apparatus 118, the wafer transfer mechanism 125, the boat 217 and the rotating mechanism 254 are electrically connected to a transfer controller 11, which is a sub-controller to be described later.

The boat 217 has a plurality of support members. The boat 217 is configured to support a plurality of wafers 200 (e.g., 50 to 125 wafers) with centers thereof aligned in vertical direction.

As shown in FIG. 2, a cleaning unit 134 is installed at the left end opposite to the wafer transfer apparatus elevator 125b and the boat elevator 115 of the transfer chamber 124. The cleaning unit 134 is configured to supply a clean atmosphere or a clean air 133 containing an inert gas and includes a supply fan (not shown) and a dust filter (not shown). A notch alignment device (not shown), which is a substrate alignment device that circumferentially aligns the wafer, is installed between the wafer transfer apparatus 125a and the cleaning unit 134.

The clean air 133 ejected through the cleaning unit 134 flows around the notch alignment device (not shown), the wafer transfer apparatus 125a and boat 217 in the standby region 126, and is then discharged from the housing 111 or circulated to the primary side which is the inhaling side of the cleaning unit 134 and is ejected back into the transfer chamber 124 by the cleaning unit 134.

A plurality of apparatus covers (not shown), which are access mechanisms of the substrate processing apparatus 100, are installed on the outer periphery of the housing 111 and the sub-housing 119. The apparatus covers may be removed during maintenance operations, and maintenance mechanics may access the substrate processing apparatus 100 through the apparatus covers. A door switch 130, which is an entrance sensor, is installed at the end of the housing 111 and the sub-housing 119 facing the apparatus covers. The door switch 130, which is an entrance sensor, is also installed at the end of the housing 111 facing the front maintenance door 104. A substrate detecting sensor 140 is installed on the loading shelf 114 to detect whether the pod 110 is placed. Switches and sensors 15 such as the door switch 130 and the substrate detecting sensor 140 are electrically connected to a controller 240 for substrate processing apparatus described below.

(3) Operation of the Substrate Processing Apparatus

Next, the operation of the substrate processing apparatus 100 according to the embodiment will be described with reference to FIGS. 2 and 3.

As shown in FIGS. 2 and 3, when the pod 110 is placed on the loading shelf 114 by an automated guided vehicle (not shown), the pod 110 is detected by the substrate detecting sensor 140, and the loading/unloading port 112 is opened by the front shutter 113. The pod 110 on the loading shelf 114 is then loaded into the housing 111 through the pod loading/unloading port 112 by the pod transfer apparatus 118.

The pod 110 in the housing 111 is automatically transferred and temporarily stored on the shelf plate 117 of the rotatable pod shelf 105 by the pod transfer apparatus 118. The pod 110 is then transferred from the shelf plate 117 onto the placement shelf 122 of the pod opener 121. Instead, the pod 110 in the housing 111 may be transferred directly onto the placement shelf 122 of the pod opener 121 by the pod transfer apparatus 118. At this time, since the wafer loading/unloading port 120 of the pod opener 121 is closed by the cap detaching mechanism 123, the transfer chamber 124 is filled with the clean air 133. The oxygen concentration in the transfer chamber 124 is lowered to, for example, 20 ppm or less, which is much lower than the oxygen concentration in the housing 111, which is the atmosphere, by filling the transfer chamber 124 with nitrogen gas as the clean air 133.

The open side of pod 110 placed on the placement shelf 122 presses against the opening of the wafer loading/unloading port 120 at the front wall 119a of the sub-housing 119 while the cap is separated by the cap detaching mechanism 123 to open the wafer entrance. After the wafer 200 is then picked up from the pod 110 through the wafer entrance by the tweezer 125c of the wafer transfer apparatus 125a and oriented by the notch alignment device, the wafer 200 is transferred to the standby region 126 and loaded into the boat 217. After the boat 217 is charged with the wafer 200, the wafer transfer apparatus 125a returns to the pod 110 and loads the next wafer 200 into the boat 217.

While the wafer transfer mechanism 125 loads the wafer 200 from the pod 122 on the placement shelf 122 of the pod opener 121 at upper end or lower end to the boat 217, another pod 110 is transferred from the rotatable pod shelf 105 onto the placement shelf 122 of the pod opener 121 at lower end or upper end by the pod transfer apparatus 118 and is opened by the pod opener 121.

When the predetermined number of wafers 200 are loaded in the boat 217, the lower end of the processing furnace 202 closed by the furnace opening shutter 147 is opened. Next, the boat 217 holding the wafers 200 is loaded into the processing furnace 202 by lifting the seal cap 219 by the boat elevator 115.

After the boat 217 is loaded, the wafers 200 are subjected to a predetermined processing in the processing furnace 202. After the processing, the boat 217 holding the processed wafers 200 is unloaded from a processing chamber 201, and the pod 110 containing the processed wafers 200 is transferred out of the housing 111.

(4) Constitution of the Processing Furnace

Figure 4:
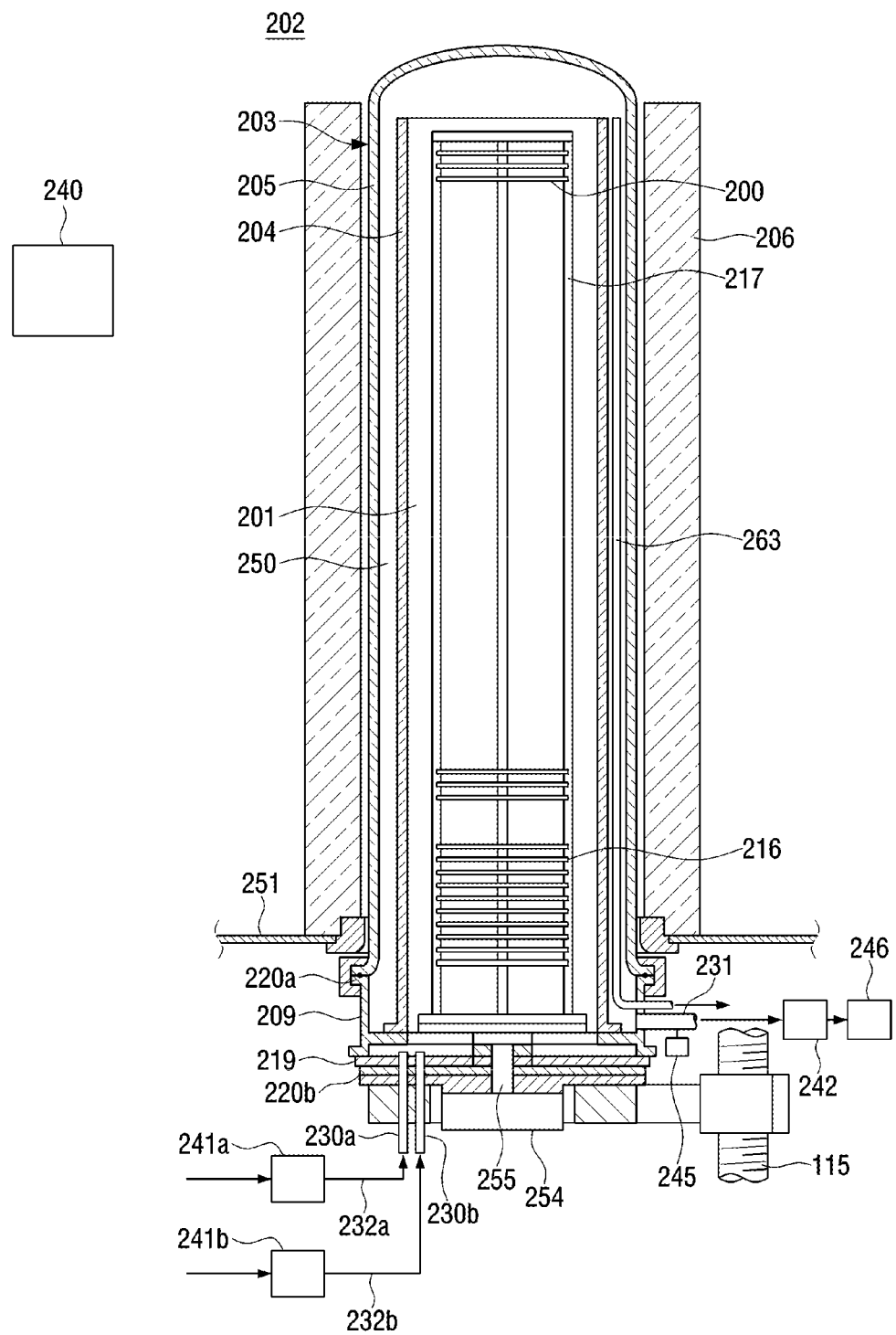
FIG. 4 is a cross-sectional view of a processing furnace of a substrate processing apparatus according to an embodiment described herein.

Next, the constitution of the processing furnace 202 according to the embodiment will be described with reference to FIG. 4. FIG. 4 is a vertical cross-sectional view of the processing furnace of the substrate processing apparatus 100 according to the embodiment described herein.

As shown in FIG. 4, the processing furnace 202 includes a processing tube 203, which is a reaction tube. The processing tube 203 includes an inner tube 204 as an inner reaction tube and an outer tube 205 as an outer reaction tube installed outside the inner tube 204. The inner tube 204 is made of a heat-resistant material such as quartz ($SiO_2$) and silicon carbide (SiC). The inner tube 204 has a cylindrical shape with an open upper end and an open lower end. The processing chamber 201 in which the wafer 200 is processed is provided in a cylindrical hollow portion in the inner tube 204. The processing chamber 201 is configured to accommodate the boat 217 to be described later. The outer tube 205 is installed concentrically with the inner tube 204. The outer tube 205 is cylindrical with an inner diameter larger than an outer diameter of the inner tube 204, and has a closed upper end and an open lower end. The outer tube 205 is made of a heat-resistant material such as quartz and silicon carbide.

A heater 206, which is a heating mechanism, is installed to surround the processing tube 203. The heater 206 is cylindrical. The heater 206 is installed vertically by being supported by a heater base 251 which is a support plate.

A manifold 209 is disposed concentrically with the outer tube 205 below the outer tube 205. The manifold 209 is made of a material such as stainless steel. The manifold 209 is cylindrical with an open upper end and an open lower end. The manifold 209 engages the lower end of the inner tube 204 and the lower end of the outer tube 205. The manifold 209 is installed to support the lower end of the inner tube 204 and the lower end of the outer tube 205. An O-ring 220a, which is a sealing member, is installed between the manifold 209 and the outer tube 205. By supporting the manifold 209 by the heater base 251, the processing tube 203 is installed vertically. The reaction vessel is constituted by the processing tube 203 and the manifold 209.

A process gas nozzle 230a and a purge gas nozzle 230b, which are a gas introduction unit, are connected to the seal cap 219, which will be described later, to communicate with the inside of the processing chamber 201. A process gas supply pipe 232a is connected to the process gas nozzle 230a. Components such as a process gas source (not shown) are connected to an upstream side of the process gas supply pipe 232 (opposite to where the process gas nozzle 230a is connected) through a mass flow controller (MFC) 241a, which is a gas flow rate controller. A purge gas supply pipe 232b is connected to the purge gas nozzle 230b. The purge gas source (not shown) is connected to an upstream side of the purge gas supply pipe 232b (opposite to where the purge gas supply pipe 232b si connected) via a mass flow controller (MFC) 241b, which is a gas flow rate controller).

The process gas supply system according to the embodiment described herein includes the process gas source (not shown), the MFC 241a, the process gas supply pipe 232a and the process gas nozzle 230a. The purge gas supply system according to the embodiment includes the purge gas source (not shown), the MFC 241b, the purge gas supply pipe 232b and the purge gas nozzle 230b. The gas supply system according to the embodiment includes the process gas supply system and the purge gas supply system. The gas supply controller 14, which is the sub-controller described later, is electrically connected to the MFCs 241a and 241b.

An exhaust pipe 231 for exhausting the inner atmosphere of the processing chamber 201 is installed in the manifold 209. The exhaust pipe 231 is disposed at the lower end of the cylindrical space 250, which is a gap between the inner tube 204 and the outer tube 205. The exhaust pipe 231 communicates with the cylindrical space 250. A pressure sensor 245 which is a pressure detector, a pressure adjusting device 242 including an automatic pressure controller (APC) and a vacuum exhaust device 246 such as a vacuum pump are connected to the downstream side of the exhaust pipe 231 (opposite to where the manifold 209 is connected). A gas exhaust mechanism according to the embodiment includes the exhaust pipe 231, the pressure sensor 245, the pressure adjusting device 242 and the vacuum exhaust device 246. A pressure controller 13, which is a sub-controller to be described later, is electrically connected to the pressure adjusting device 242 and the pressure sensor 245.

The seal cap 219 is a furnace opening lid that closes the lower end opening of the manifold 209 in airtight manner and is installed under the manifold 209. The seal cap 219 is configured to be in contact with the lower end of the manifold 209 from thereunder. The seal cap 219 is made of a metal such as stainless steel. The seal cap 219 is disk-shaped. An O-ring 220b, which is a sealing member, is provided between the lower end of the manifold 209 and the upper surface of the seal cap 219.

A rotating mechanism 254 for rotating the boat is installed opposite to the processing chamber 201 with respect to the seal cap 219. A rotating shaft 255 of the rotating mechanism 254 penetrates the seal cap 219 and supports the boat 217 from therebelow. The rotating mechanism 254 may rotate the wafer 200 by rotating the boat 217.

The seal cap 219 is vertically elevated by the boat elevator 115, which is a substrate retainer elevating mechanism vertically installed outside the processing tube 203. By lifting the seal cap 219, the boat 217 may be transferred into or out of the processing chamber 201. The boat 217 may be loaded into or unloaded from the process chamber 201. A transfer controller 11, which is a sub-controller to be described later, is electrically connected to the rotating mechanism 254 and the boat elevator 115.

As described above, the boat 217 which is the substrate retainer supports the wafers 200 concentrically arranged in multiple stages in a horizontal orientation. A plurality of heat insulating plates 216, which are insulating members, are arranged in a multiple stages in a horizontal orientation below the boat 217. The insulating plates 216 are disc-shaped like the wafers 200. The heat from the heater 206 is suppressed from be transmitted to the manifold 209 by the heat insulating plates 216.

A temperature sensor 263, which is a temperature detector, is installed in the processing tube 203. A heating mechanism according to the embodiment includes the heater 206 and the temperature sensor 263. A temperature controller 12, which is a sub-controller to be described later, is electrically connected to the heater 206 and the temperature sensor 263.

The substrate processing system according to the embodiment includes the gas exhaust mechanism, the gas supply system, and the heating mechanism.

(5) Operation of the Processing Furnace

Next, a method (process) of forming a thin film on the wafers 200 by a CVD method using the processing furnace 202 according to the above-described configuration as one of manufacturing processes of a semiconductor device will be described with reference to FIG. 4. In the following description, the controller 240 for the substrate processing apparatus controls the operation of components constituting the substrate processing apparatus 100.

After the wafers 200 are charged into the boat 217 (wafer charging), the boat 217 containing the wafers 200 is lifted by the boat elevator 115 and transferred into the processing chamber 201 as shown in FIG. 4 (boat loading). The seal cap 219 seals the lower end of the manifold 209 via the O-ring 220b with the boat 217 loaded in the processing chamber 201.

The processing chamber 201 is exhausted by the vacuum exhaust device 246 until the inner pressure of the processing chamber 201 is at a desired vacuum level. At this time, the opening degree of the valve of the pressure adjusting device 242 is feedback-controlled based on the pressure measured by the pressure sensor 245. The processing chamber 201 is heated by the heater 206 until the inner temperature of the processing chamber 201 reaches a desired temperature. At this time, the amount of current flowing to the heater 206 is feedback-controlled based on the temperature detected by the temperature sensor 263. The rotating mechanism 254 may continue to rotate the boat 217 and the wafer 200.

Next, a process gas supplied from the process gas source (not shown) and having the flow rate adjusted by the MFC 241a flows through the process gas supply pipe 232a and the process gas nozzle 230a into the processing chamber 201. The supplied process gas flows upward in the processing chamber 201, flows through the upper end opening of the inner tube 204, and is exhausted through the exhaust pipe 231. The gas contacts the surface of the wafers 200 as they pass through the processing chamber 201 where the thin film is deposited on the surface of the wafers 200 by a thermal CVD reaction.

Once a predetermined processing time has elapsed, a purge gas, supplied from the purge gas source and having the flow rate thereof adjusted by the MFC 241b, is supplied into the processing chamber 201. The inner atmosphere of the processing chamber 201 is replaced with the inert gas, and the inner pressure of the processing chamber 201 is returned to normal pressure.

The lower end of the manifold 209 is then opened by lowering the seal cap 219 by the boat elevator 115. The boat 217 containing the processed wafers 200 is unloaded from the processing tube 203 through the lower end of the manifold 209. The processed wafers 200 are then retrieved from the boat 217 and accommodated in the pod 110 (wafer discharging).

(6) Configuration of Controller for Substrate Processing Apparatus

Next, the controller 240 for controlling the operation of the components constituting the processing furnace 202 and the surrounding configuration thereof will be described with reference to FIG. 5.

Figure 5:
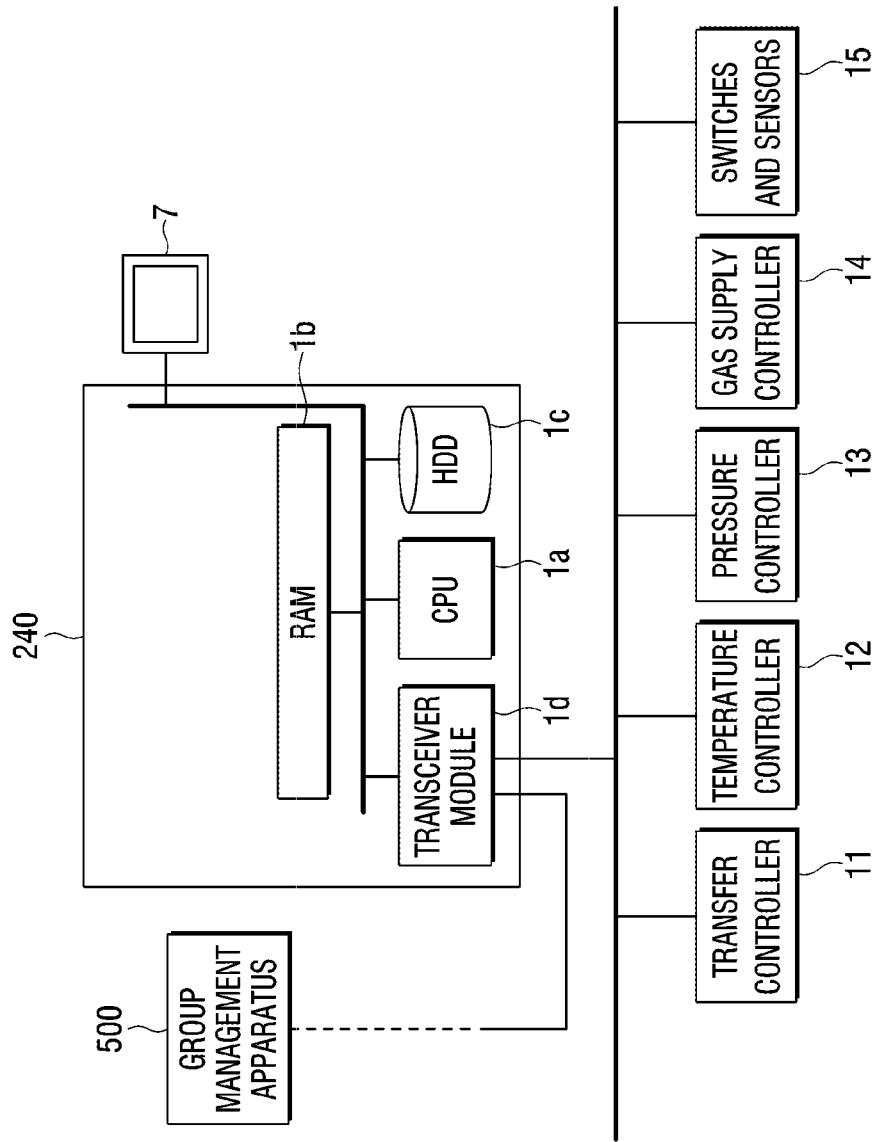
FIG. 5 is a block diagram illustrating a controller for substrate processing and its surrounding configuration of a substrate processing apparatus according to an embodiment described herein.

FIG. 5 is a block diagram illustrating a controller for substrate processing and surrounding configuration thereof according to the embodiment.

<Controller for the Substrate Processing Apparatus>

The controller 240 is embodied by a computer having a central processing unit (CPU) 1a serving as an arithmetic unit, a memory 1b (RAM, Random Access Memory) serving as a temporary storage, a hard disk (HDD) 1c as a fixed storage, a transceiver module 1d as a communication control unit, and a clock function (not shown). Various program files (not shown) such as a display program for displaying a gas flow pattern diagram and an editing tool for editing an integrated file required for editing a process recipe (e.g. substrate processing recipe) and a cleaning recipe (e.g. maintenance recipe), drawing files and icon files are stored in HDD 1c. Further, the integrated file necessary for editing the gas flow pattern diagram, and predetermined data files as the item files and drawing files (e.g. bitmap files) necessary for displaying the gas flow pattern diagram are stored in the hard disk 1c. In the embodiment, a file containing the process recipe or the cleaning recipe is referred to as a recipe file, and a file created and editable by the dedicated editing tool for creating the gas flow pattern diagram is referred to as an integrated file.

The substrate processing recipe is a recipe that defines information such as processing conditions and processing sequences for processing the wafer 200. Control information such as control value or timing transmitted to the sub-controller such as the transfer controller 11, the temperature controller 12, the pressure controller 13 and the gas supply controller 14 is stored (defined) in the recipe file for each step of substrate processing.

The operating unit 7 includes an input unit including an input device such as a touch panel and a display unit including a display device such as an LCD. That is, the operating unit 7 may be a display unit equipped with a touch panel. The input unit is connected to the controller 240 and transmits an operation command to the controller 240 for operating the substrate transfer system or the substrate processing system. The display unit displays the operation screen necessary when operating the substrate transfer system or substrate processing system. The operation screen has various display fields and operating buttons for checking the state of the substrate transfer system or the substrate processing system, or for inputting operation commands to the substrate transfer system or the substrate processing system. The input unit of the operating unit 7 is not limited to a touch panel. The operating unit 7 may be implemented by an operation terminal (terminal device) having a display unit and a keyboard (input unit) such as a PC.

The CPU (Central Processing Unit) 1a is the backbone of the controller 240. The CPU 1a executes a control program stored in a ROM (not shown), and also executes a recipe (for example, a process recipe) stored in the HDD 1c in accordance with an instruction from the touch panel 7. The ROM may be implemented by, for example, an EEPROM, a flash memory and a hard disk, and is a recording medium storing a program such as an operating program of the CPU 1a. The memory 1b (RAM) functions as a work area (temporary storage) of the CPU 1a. The controller 240 according to the embodiment may be implemented by a dedicated system, or may be implemented using a conventional computer system. For example, by installing the program through a recording medium such as a flexible disk, a CD-ROM and a USB memory storing a program for executing the above-described processing on a large machine (super computer), a controller 240 may be implemented.

The various methods may be employed to supply the program. As described above, it is also possible to supply the program via, for example, a communication line, a communication network and a communication system as well as via a recording medium. For example, the program may be posted on a bulletin board of a communication network, and the program may be provided through the communication network. The above-described processing may be performed by executing the program under the control of an operating system.

<Connection Between the Controller for the Substrate Processing Apparatus and the Group Management Apparatus>

The transceiver module 1d of the controller 240 is connected to the group management apparatus 500 via the network 400 so as to communicate with the group management apparatus 500 such as a host computer and a monitoring server.

The transceiver module 1d is configured to control communication with the group management apparatus 500.

<Connection Between the Controller for the Substrate Processing Apparatus and the Sub-controller>

The transfer controller 11, the temperature controller 12, the pressure controller 13 and the gas supply controller 14 which are sub-controllers, and the switches and sensors 15 are connected to the transceiver module 1d of the controller 240.

The transfer controller 11 is configured to control the transfer operations performed by the substrate transfer system including the rotatable pod shelf 105, the boat elevator 115, the pod transfer apparatus 118 (substrate container transfer apparatus), the wafer transfer mechanism 125 (substrate transfer mechanism), the boat 217 and the rotating mechanism 254. Sensors (not shown) may be installed in the rotatable pod shelf 105, the boat elevator 115, the pod transfer apparatus 118 substrate container transfer apparatus, the wafer transfer mechanism 125 substrate transfer mechanism, the boat 217 and the rotating mechanism 254. The transfer controller 11 is configured to transmit the value detected by the sensors to the controller 240 depending on the range of the detected values.

The temperature controller 12 is configured to control the heater 206 of the processing furnace 202 so as to control the inner temperature of the processing furnace 202. The temperature controller 12 is configured to notify the controller 240 whether the temperature is normal or abnormal depending on the range of the temperatures detected by the temperature sensor 263.

The pressure controller 13 is configured to control the pressure adjusting device 242 such that the processing chamber 201 has a desired the inner pressure at a desired timing based on the pressure detected by the pressure sensor 245. The pressure controller 13 is configured to notify the controller 240 whether the inner pressure is normal or abnormal depending on the range of the pressures detected by the pressure sensor 245.

The gas supply controller 14 is configured to control the supply of gas through the process gas supply pipe 232a and the purge gas supply pipe 232b or by stopping the supply of the gas by opening and closing the gas valve. The gas supply controller 14 is configured to control the MFCs 241a and

241*b* such that the gas supplied into the processing chamber 201 has a desired flow rate at a desired timing. The gas supply controller 14 is configured to notify the controller 240 whether the supply of gas is normal or abnormal according to the range of values detected by a sensor provided in the gas valve (not shown) or the MFCs 241*a* and 241*b*.

Switches and sensors 15 such as the door switch 130 and the substrate detecting sensor 140 detects and transmits to the controller 240 whether components such as the front maintenance door 104 is opened or closed or detects and transmits to the controller 240 whether the pod 110 is placed on the loading shelf 114.

<Preferred Embodiment>

Next, the gas flow pattern diagram stored in the integrated file will be described with reference to FIGS. 6 through 10.

<First Embodiment>

Figure 6:
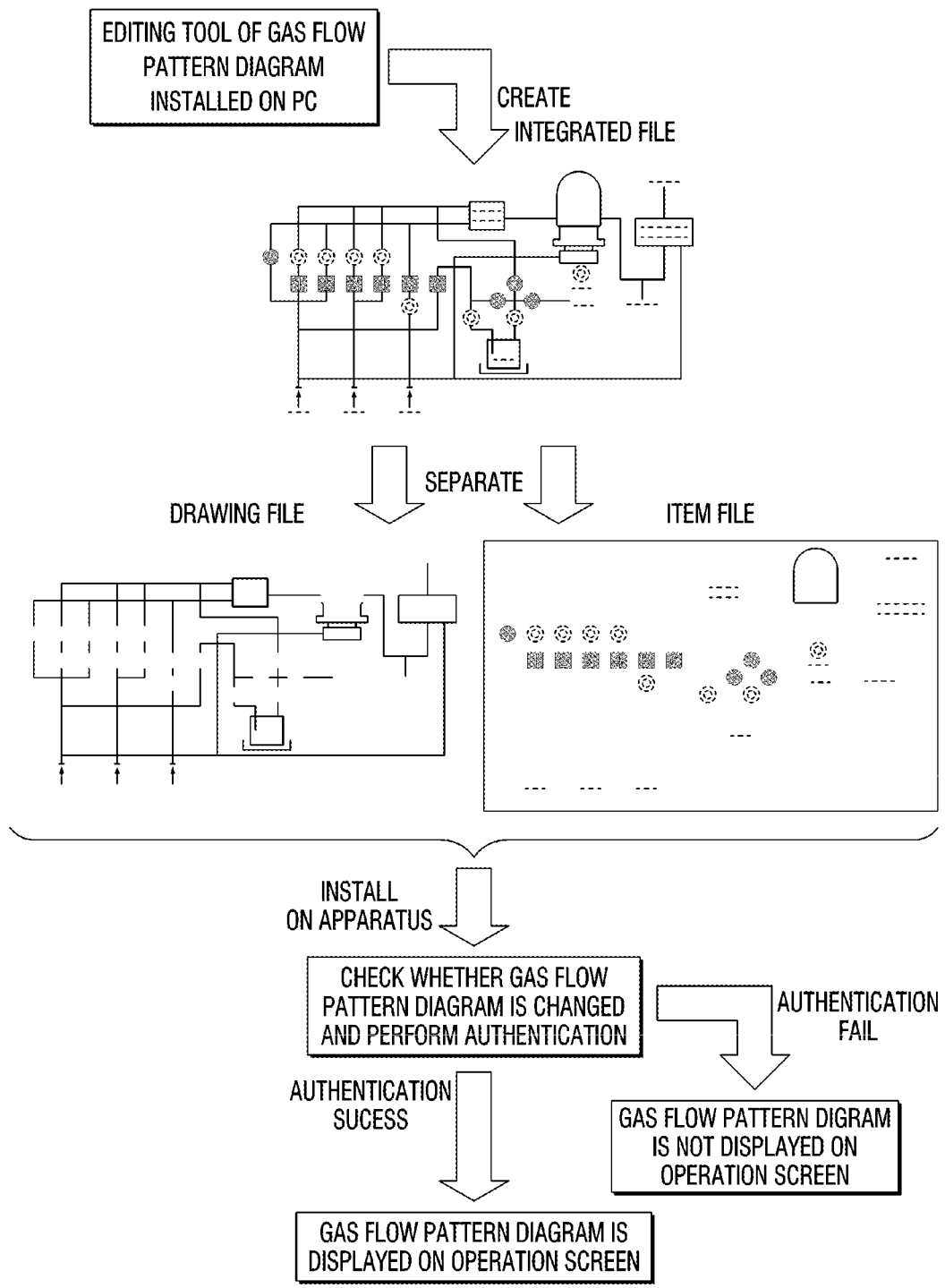
FIG. 6 is a flow diagram illustrating installation of an integrated file displayed on an operation screen of a substrate processing apparatus according to an embodiment described herein.

FIG. 6 illustrates the flow of creating an integrated file using a dedicated editing tool for editing the gas flow pattern diagram and displaying the same on the operation screen. The integrated file is created by the dedicated editing tool for the gas flow pattern diagram. The integrated file is installed in the controller 240 of the substrate processing apparatus. Specifically, the integrated file includes a drawing file and an item file therein. When the integrated file is installed, the drawing file and the item file are installed in the controller 240 of the substrate processing apparatus separately from the integrated file.

The controller 240 detects a change in the gas flow pattern diagram during the initialization (data change detection process) and performs an authentication process. In the data change detection process, the data in the gas flow pattern diagram is checked for a change by comparing the data corresponding to the item file included in the integrated file with the data corresponding to the separately stored item file. Here the separately stored item file has been saved at the end of the previous process and has been copied into the memory unit In the data change detection process, it is detected whether the integrated file for editing the gas flow pattern diagram has been modified. In the authentication process (password authentication process), the operation screen is displayed, the display program is executed, and the gas flow pattern diagram is displayed if the authentication is successful. If the authentication fails, the operation screen is not displayed. The details of the password authentication process will be described later.

Once the integrated file and item file are encrypted, the integrated file and item file may not be modified directly. It is possible to directly modify the integrated file and the item file without using the editing tool by interpreting the data structure. However, when reading the integrated file and the item file, it is checked whether the integrated file and the item file are tampered with through decryption, and the integrated file and the item file are not displayed on the operation screen when the integrated file and the item file are determined to be tampered with. The process of checking whether the data is tampered with will be described later in detail.

Figure 8:
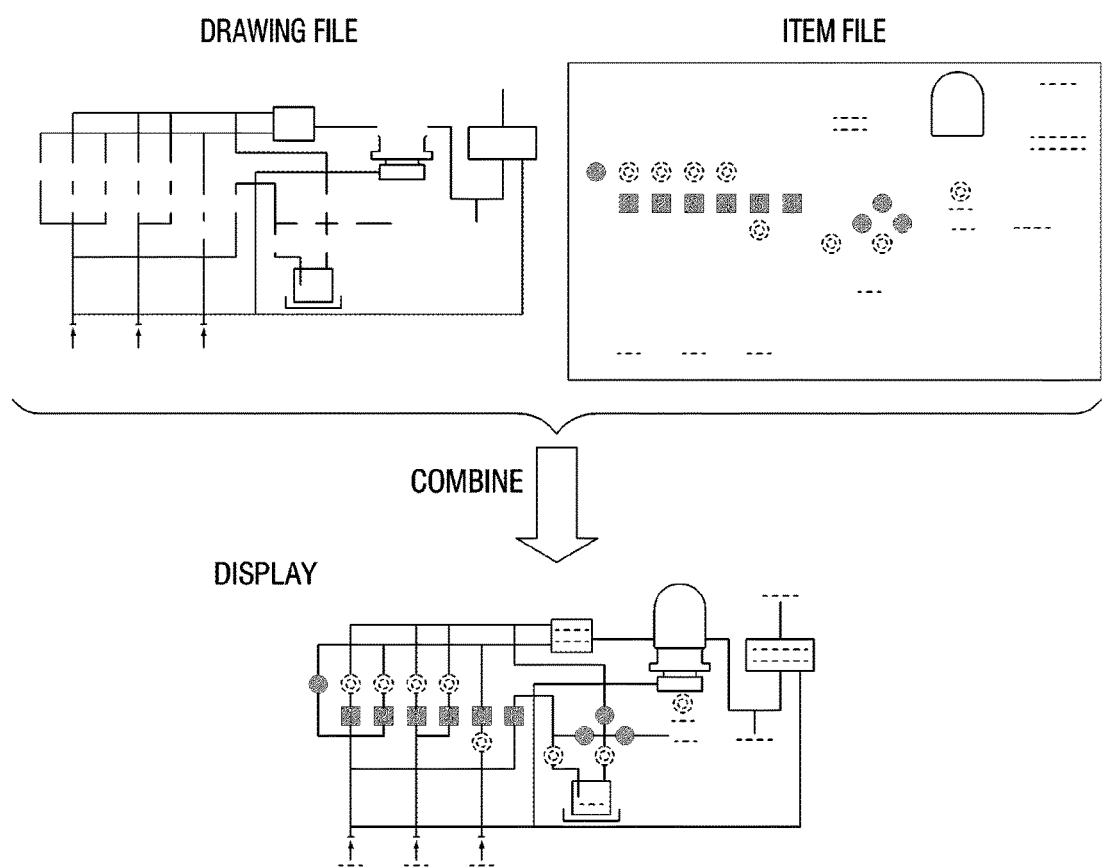
FIG. 8 illustrates an operation screen in which an integrated file is displayed in a substrate processing apparatus according to an embodiment described herein.

FIG. 8 illustrates the gas flow pattern diagram displayed by the controller 240 on the display unit (the manner in which the gas flow pattern diagram is displayed on the operation screen of the substrate processing apparatus). The drawing file and the item file are combined and the gas flow pattern diagram is created and displayed on the operation screen.

The display program, which may be a part of the editing tool, may be started by the login of an operator. Since the login process is performed even when the controller 240 displays the gas flow pattern diagram by executing the display program, an operator without permission may not modify the configuration such as the valve opening/closing conditions of the gas flow pattern diagram. The display program may be configured not to run if an operator without permission logs in.

According to the first embodiment, at least one of effects (a) through (c) below may be provided.

(a) According to the first embodiment, since the authentication process is performed by inputting a password, unauthorized personnel may be prevented from arbitrarily modifying or editing the integrated file.

(b) According to the first embodiment, the data change detection process is performed, and if the integrated file is changed, the password authentication process is performed. Therefore, unauthorized editing of an integrated file by unauthorized personnel may be detected.

(c) According to the first embodiment, unauthorized editing of the integrated file or the item file by unauthorized personnel may be prevented by encrypting the integrated file or the item file.

<Second Embodiment>

Figure 7:
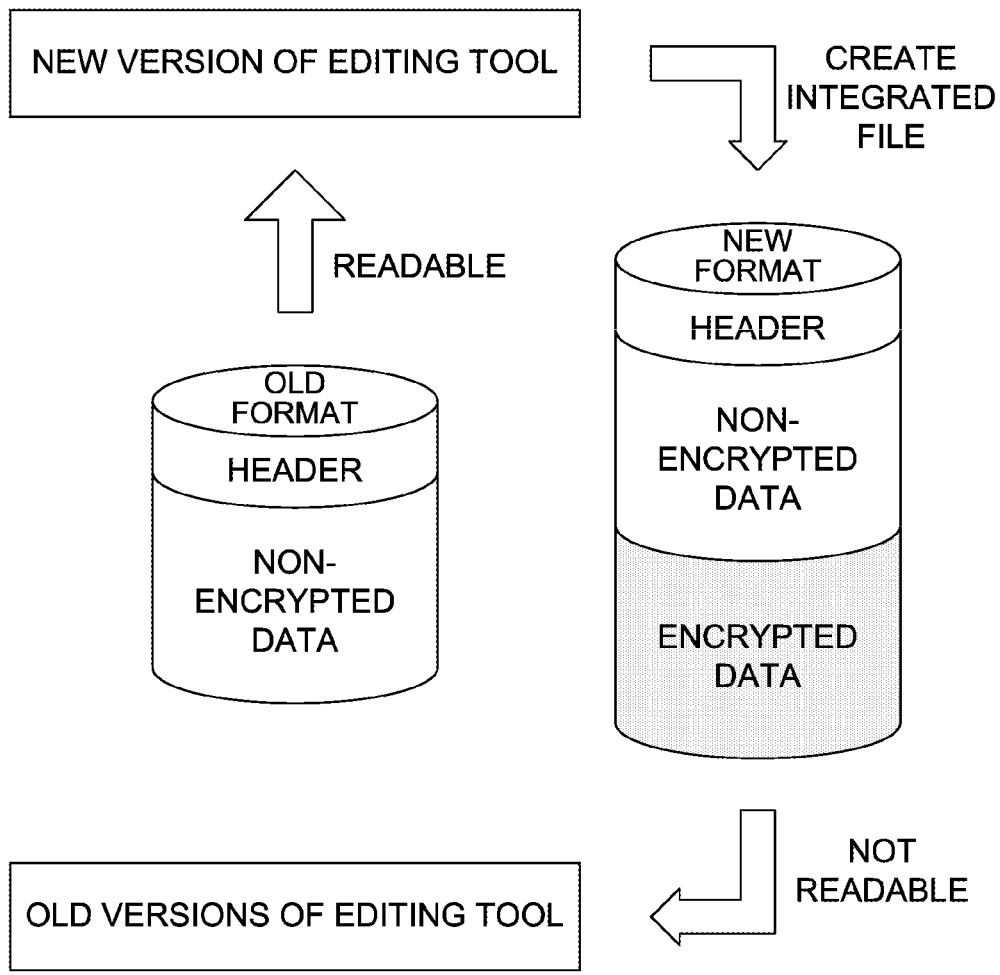
FIG. 7 is a diagram illustrating a process for preventing unauthorized personnel from editing an integrated file displayed on an operation screen of a substrate processing apparatus according to the embodiment described herein.

The second embodiment will be described with reference to FIG. 7. With reference to FIG. 7, countermeasures to be taken when an old version of the editing tool is lost will be described. The gas flow pattern diagram displayed on the operation screen for operating the controller 240 is unique for each substrate processing apparatus 100. The gas flow pattern diagram is created by the dedicated editing tool.

In a new version of editing tool, a format of the integrated file is changed. a new format of the integrated file includes data that is encrypted. For example, according to the second embodiment, the data is compressed. That is, the the integrated file contains encrypted data. Specifically, the integrated file created by the new version of the editing tool has a data structure (format) includes a header; a non-encrypted data containing at least the item file; the drawing file; and an encrypted data obtained from encrypting the item file. When the integrated file is stored (installed) in the controller 240, a copy of the non-encrypted data included in the integrated file is separately stored as the item file and the drawing file. The item file includes character data or numeric data and contains items representing MFC, valves and processing furnaces for example. The drawing file includes icons representing piping, furnace opening and vaporizer for example.

A conventional editing tool may not recognize the encrypted data contained in the integrated file. That is, older versions of the editing tool may recognize only integrated files that contain only a header and a non-encrypted data. Therefore, even if the old version of the editing tool is lost, the integrated file according to the second embodiment may not be edited using the old version of the editing tool, and unauthorized personnel may be prevented from editing the gas flow pattern diagram. For example, even if a third party as the unauthorized personnel want to activate the old version of the editing tool and manipulate the new version of the editing tool, the terminal device such as a personal computer on which the old version of the editing tool is installed cannot read the new version of the editing tool. Therefore, it is impossible to remodel the gas flow pattern diagram. That is, even if unauthorized personnel attempts to edit the integrated file according to the second embodiment using the old version's editing tool, the old editing tool is unable to recognize the integrated file. Therefore, unauthorized personnel may not tamper with the gas flow pattern diagram.

According to a second embodiment, at least one of effects (d) and (e) below in addition to the effects of the first embodiment may be provided.

(d) According to the second embodiment, the format of the integrated file is changed by encrypting the data in the integrated file. Therefore, unauthorized personnel may be prevented from editing the integrated file using the older versions of the editing tool. Therefore, even if the data editing tool is lost, editing work of a third party can be prevented, so that it is possible to prevent the leakage of data to the third party.

(e) According to the second embodiment, by changing the format of the integrated file, the integrated file may not be read or edited using the older versions of the editing tool. Thus, the risk of abuse of the older versions of the editing tool may be suppressed.

<Third Embodiment>

Figure 9:
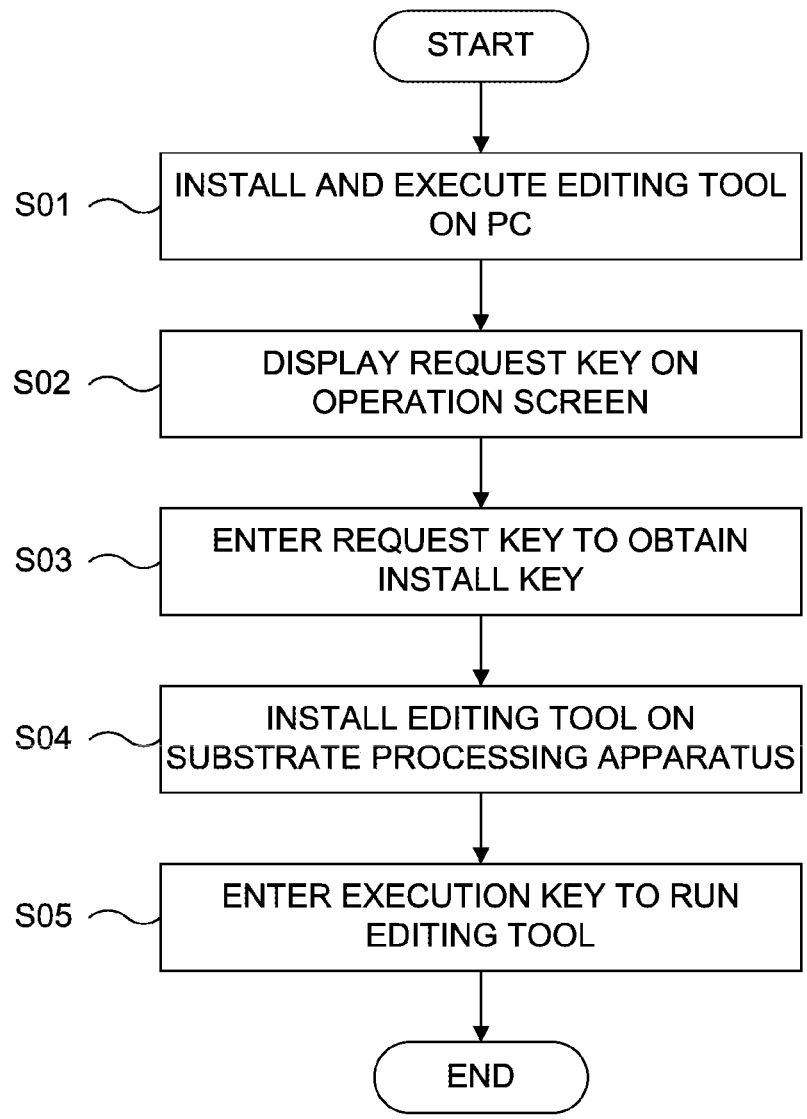
FIG. 9 is a diagram illustrating a process for preventing unauthorized personnel from using a dedicated editing tool for creating an integrated file displayed on an operation screen of a substrate processing apparatus according to the embodiment described herein.

The third embodiment is described with reference to FIG. 9. With reference to FIG. 9, countermeasures to be taken when a new version of the editing tool is lost will be described.

FIG. 9 illustrates operations from installing the editing tool to displaying the same on the operating screen.

Referring to FIG. 9, the editing tool is installed on the PC and executed (S01). Here, the editing tool is configured that is cannot be activated only by copying. Further, in order to activate the editing tool, a password is required. The operator must enter an install key when the editing tool is first installed and activated (executed) in order to prevent unauthorized use of the editing tool. For example, when the editing tool is first executed on the PC, a request key is displayed on the operation screen (S02). In order to obtain the install key corresponding to the request key, the operator must operate the PC to connect to a predetermined web site, for example, a predetermined web page of a company the operator works for, and input the request key at the predetermined web site. When the request key is entered, the install key for running the editing tool is obtained (S03). The install key is changed, for example, every few seconds, so that the acquired install key may not be used after a few seconds have elapsed. That is, even when the install key is leaked to unauthorized personnel, it is impossible to install and execute the editing tool using the install key. When the operator executes the editing tool and enters the install key, the editing tool may be normally used. Thereafter, the editing tool is installed on the substrate processing apparatus (S04). The installation process is similar to that of the PC. In order to use the editing tool normally in the substrate processing apparatus, the install key must be also entered at initial startup similar to the PC. Since the installation of the editing tool and the method of obtaining the install key are the same as those of the PC, a detailed description is omitted. Further, whenever the editing tool is executed in the PC or the substrate processing apparatus, an additional password (execution key) must be entered apart from entering the install key (S05). As in the case of the Install key, a predetermined execution key is obtained by accessing the predetermined web page. The execution key may be changed daily. When the predetermined web page is unable to be accessed, daily execution key is unable to be obtained. Therefore, even if the editing tool is leaked to unauthorized personnel, unauthorized personnel who does not have access to the predetermined web page may not use the editing tool. Since the operator may start the editing tool on the PC to create the integrated file and install the created integrated file into the substrate processing apparatus within a day, it is preferable that the execution key required to execute the editing tool on the PC differs from the execution key required to execute the editing tool on the substrate processing apparatus.

According to the third embodiment, when the editing tool is executed, a plurality of authentication keys or passwords are required to be inputted. That is, the editing tool is configured to use a combination of the install key that changes every few seconds and the execution key that changes daily. Since the install key and the execution key must be obtained from the predetermined web site, the install key and execution key can be obtained only through the authorized operator. In addition, since the install key and the execution key changes in short period time, unauthorized personnel is unable to use the keys. Therefore, even if the editing tool is leaked to unauthorized personnel, unauthorized personnel is prevented from using the editing tool.

In order to obtain the install key required for the initial activation (execution) of the editing tool, the operator should log into the predetermined web site (e.g., the web site of a certain company), and enter the request key displayed on the operation screen at the initial activation (execution) of the editing tool into an input filed shown the predetermined web page. In order to access the predetermined web site, an authentication is required. That is, the login password is required to access the company's predetermined web site. While an authorized operator may obtain a login password to access the web site, unauthorized personnel is unable to obtain the login password and therefore is unable to access the web site let alone obtain the install key. It is therefore impossible for unauthorized personnel to use the editing tool. That is, even if an unauthorized person such as the former operator illegally obtains the editing tool, using the editing tool is almost impossible.

Even if the editing tool is installed on the PC by entering the install key, the execution key is required to execute the editing tool and create the integrated file storing the gas flow pattern diagram. That is, the execution key is required to execute the editing tool and create or modify the integrated file, and then install the integrated file back into the substrate processing apparatus. Unauthorized personnel who is unable to access the predetermined web site is unable to edit the gas flow pattern diagram using the editing tool since the execution key may only be obtained from the certain company's web site. Therefore, by not allowing a third party such as unauthorized personnel to display the gas flow pattern diagram created by the editing tool, the third party other than the authorized operator cannot edit the gas flow pattern diagram.

According to a third embodiment, at least one of effects (f) through (m) below in addition to the effects of the first embodiment and the second embodiment may be provided.

(f) According to the third embodiment, when the editing tool is executed, the execution key (execution password) must be entered. The execution key, which may be acquired only through the certain company's web site, is valid for one day and changed daily. Therefore, the former operator may not use the editing tool since the former operator cannot access the certain company's web site by entering the known execution key. That is, unauthorized personnel may not edit the integrated file by using the editing tool and the known execution key.

(g) According to the third embodiment, unauthorized personnel may not work with the editing tool unless the execution key is obtained. Since the execution key may only be obtained from the certain company's website, a person other than the authorized operator of the company is unable to use the editing tool. Unauthorized personnel is unable to edit the gas flow pattern diagram since the editing tool is unable to be used without obtaining the execution key.

(h) According to the third embodiment, since it is difficult for unauthorized personnel other than the authorized operator to acquire the execution key. Since the gas flow pattern diagram created by the editing tool cannot be displayed to the unauthorized personnel, the gas flow pattern diagram is unable to not be read or edited even if the unauthorized personnel acquires the editing tool. It impossible for the unauthorized personnel to read or edit the integrated file created by the editing tool unless the execution key is acquired. The unauthorized personnel cannot edit the gas flow pattern diagram.

(i) According to the third embodiment, the execution key may be obtained from only the certain company's web site. Thus, authorized operators may easily obtain the execution key while unauthorized personnel, such as former operators, are unable to obtain the execution key through the website. Therefore, unauthorized personnel is unable to use the editing tool arbitrarily even if they illegally acquired the editing tool and the editing tool may only be used by an authorized company. This prevents malicious business using the editing tool.

(j) According to the third embodiment, in order to edit the gas flow pattern diagram using the editing tool, the certain company's authorized operator is necessary. This prevents unauthorized personnel from editing the gas flow pattern diagram using the editing tool.

(k) According to the third embodiment, unauthorized personnel is unable to edit the gas flow pattern diagram using the editing tool. Therefore, security risks may be reduced because a person other than those with knowledge of the substrate processing apparatus is unable to edit the gas flow pattern diagram.

(l) According to the third embodiment, unauthorized personnel is unable to edit the gas flow pattern diagram and therefore may not arbitrarily change the gas flow pattern diagram. That is, it is possible to prevent unauthorized personnel from arbitrarily changing the gas flow pattern of the gas used to process the substrate. In particular, the gases used for processing the substrate in the substrate processing apparatus are often harmful or inflammable. Safety may be improved since a person other than those with knowledge of the substrate processing apparatus is unable to arbitrarily modify the gas flow pattern diagram.

(m) According to the third embodiment, unauthorized personnel is unable to arbitrarily modify the gas flow pattern diagram using the editing tool, thereby reducing security risks. In the substrate processing apparatus, the gas used for processing the substrate is often harmful or inflammable. An accident may occur when a person other than those with knowledge of the substrate processing apparatus modifies the gas flow pattern diagram. According to the third embodiment, unauthorized personnel is unable to arbitrarily modify the gas flow pattern diagram, thus preventing accidents.

<Fourth Embodiment>

Figure 10:
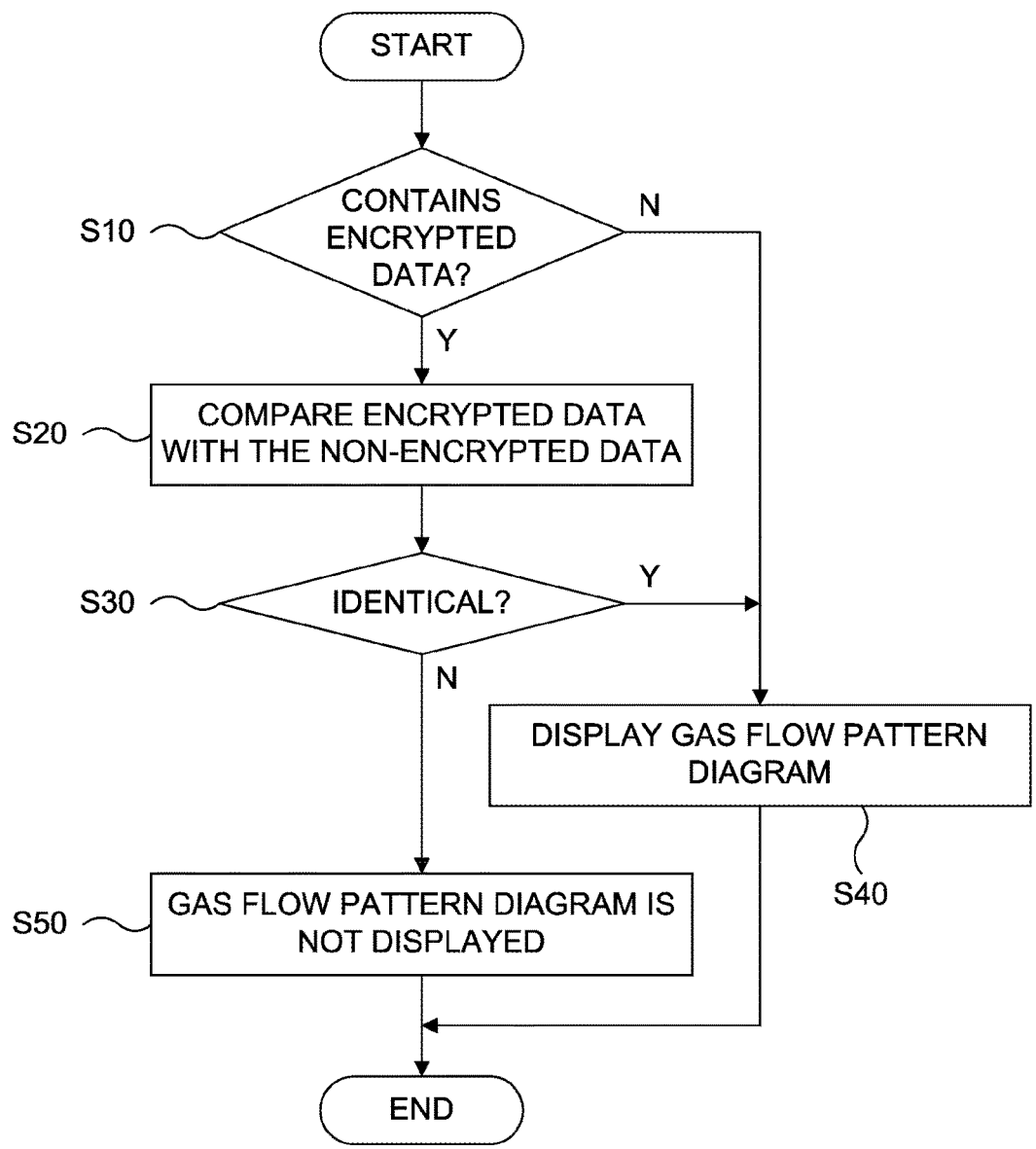
FIG. 10 illustrates a data check process executed before displaying a gas flow pattern diagram in a substrate processing apparatus according to the embodiment describe herein.

The data integrity check process performed before the gas flow pattern diagram is displayed on the display unit (operation screen) will be described with reference to FIG. 10.

When the integrated file storing the gas flow pattern diagram is loaded by entering the execution key, the format of the integrated file is determined. That is, the controller 240 of the substrate processing apparatus determines whether the integrated file contains the encrypted data (S10). This determines whether the integrated file is a new format or an old format. When the integrated file does not contain the encrypted data (N in S10) but contains only the non-encrypted data, the gas flow pattern diagram is displayed on the operation screen.

When the integrated file contains the encrypted data (Y in S10), the encrypted data is decrypted and compared with the non-encrypted data (S20). Here, the encrypted data may be data obtained by compressing the non-encrypted data. When the data obtained by decrypting the encrypted data and the non-encrypted data match (Y in S30), the gas flow pattern diagram is displayed on the display unit (S40). When the data do not match (N in S30), it is determined that the data is tampered with and the gas flow pattern diagram is not displayed (S50).

According to the fourth embodiment, in order to display the gas flow pattern diagram on the operation screen of the substrate processing apparatus, it is checked whether the data has been tampered with when the integrated file is loaded by the editing tool using encrypted data. The gas flow pattern diagram is not displayed on the operation screen when the integrated file has been tampered with.

According to the fourth embodiment, at least one of effects (n) through (o) below effects of the first embodiment through the third embodiment may be provided.

(n) According to the fourth embodiment, when the integrated file does not contain the encrypted data, the gas flow pattern diagram is displayed on the operation screen without performing the check process using the encrypted data. When the integrated file contains the encrypted data, the gas flow pattern diagram is displayed on the operation screen only when the integrated file is not tampered with. Thus, it is possible to prevent executing the integrated file tampered with by unauthorized personnel.

(o) According to the fourth embodiment, unauthorized personnel is unable to edit the gas flow pattern diagram since the gas flow pattern diagram is not displayed on the operation screen of the processing apparatus when the integrated file has been tampered with.

According to the first embodiment through the fourth embodiment described above, unauthorized personnel may be prevented from editing the integrated file using the editing tool even when unauthorized personnel has an illegally obtained editing tool.

Also, in the first embodiment through the fourth embodiment described above, the editing tool is mainly used at the domestic head office, but may also be used at the overseas branch office. Therefore, the data editing tool may be leaked from a overseas branch office. However, according to the embodiments described herein, even when the data editing tool is leaked by unauthorized personnel, the integrated file cannot be edited using the leaked data editing tool.

According to the first embodiment through the third embodiment, it is possible to inhibit the gas flow pattern diagram from being edited even when the editing tool for editing the gas flow pattern diagram is leaked by unauthorized personnel. Therefore, a person other than those who have knowledge of the substrate processing apparatus may not perform operations such as modifying gas pipes in the gas flow pattern diagram.

According to the first embodiment through the fourth embodiment, even when the editing tool for the gas flow pattern diagram is leaked by unauthorized personnel, the risk of a person other than those with knowledge of the substrate processing apparatus modifying the gas flow pattern diagram may be reduced. In particular, the gases used for processing the substrate in the semiconductor manufacturing apparatus are harmful or inflammable. Therefore, when the gas flow pattern diagram is arbitrarily edited, an accident may occur due to the difference between the actual gas pipes and the gas flow pattern diagram. According to the first embodiment through the fourth embodiment, such an accident may be prevented.

<Other Embodiments>

The editing tool may be installed on a substrate processing apparatus as well as an operating terminal (or PC). That is, the above-described technique may also be applied the controller 240 of the substrate processing apparatus.

Although the semiconductor manufacturing apparatus is described as an example of the substrate processing apparatus in the above-described embodiments, the described technique is not limited to the semiconductor manufacturing apparatus, and may be applied to an apparatus for processing a glass substrate such as an LCD manufacturing apparatus. The described technique may be applied regardless of the type or content of substrate processing. For example, the described technique may be applied not only to the film forming process, but also to the annealing process, the oxidation process, the nitridation process and the diffusion process. The film forming process may include, for example, CVD, PVD, a film forming process for forming oxide film, a nitride film, or a film containing metal.

Although the embodiment has been described in detail, the technique described is not herein limited to the embodiments described above, and may be variously modified without departing from the scope of the technique.

According to the technique described here, unauthorized personnel without permission may be prevented from tampering with file data.

What is claimed is:

1. A processing apparatus comprising:
an operating unit configured to display an operation screen for editing an integrated file containing: non-encrypted data corresponding to an item file; a drawing file; and encrypted data obtained by encrypting the item file;
a memory unit configured to store the integrated file; and
an arithmetic unit configured to: (a) compare the item file with data obtained by decrypting the encrypted data; and (b) combine and display the item file and the drawing file on the operation screen according to a result of comparison performed in (a),
wherein the arithmetic unit is further configured to run an editing tool for editing the integrated file, and
the operating unit is further configured to receive an install key when the editing tool is activated for first time, and the install key is changed every few seconds or daily.

2. The processing apparatus of claim 1, wherein the drawing file comprises a bitmap file.

3. The processing apparatus of claim 1, wherein neither the drawing file nor the item file is editable without being combined in (b).

4. The processing apparatus of claim 1, wherein the encrypted data is obtained by compressing the item file.

5. The processing apparatus of claim 4, wherein the data is obtained by decompressing the encrypted data.

6. The processing apparatus of claim 5, wherein the item file is compared with the data obtained by decompressing the encrypted data in (a).

7. The processing apparatus of claim 1, wherein the memory unit is further configured to separately store a copy of the item file, and the arithmetic unit is further configured to compare the copy of the item file with the non-encrypted data corresponding to the item file.

8. The processing apparatus of claim 7, wherein the arithmetic unit is further configured to perform a password authentication process when a modification of the non-encrypted data corresponding to the item file is detected by comparing the copy of the item file with the non-encrypted data corresponding to the item file.

9. The processing apparatus of claim 8, wherein the arithmetic unit is further configured to display the item file and the drawing file on the operation screen only when an authentication is successful in the password authentication process.

10. The processing apparatus of claim 1, wherein the integrated file further comprises a header.

11. The processing apparatus of claim 2, wherein the arithmetic unit is further configured to display the item file and the drawing file on the operation screen only when the item file matches the data obtained by decrypting the encrypted data.

12. A controller comprising:
an operating unit configured to display an operation screen for editing an integrated file containing: non-encrypted data corresponding to an item file; a drawing file; and encrypted data obtained by encrypting the item file;
a memory unit configured to store the integrated file; and
an arithmetic unit configured to: (a) compare the item file with data obtained by decrypting the encrypted data; and (b) combine and display the item file and the drawing file on the operation screen according to a result of comparison performed in (a),
wherein the arithmetic unit is further configured to run an editing tool for editing the integrated file, and
the operating unit is further configured to receive an install key when the editing tool is activated for first time, and the install key is changed every few seconds or daily.

13. A processing system comprising:
a processing apparatus comprising:
an operating unit configured to display an operation screen for editing an integrated file containing: non-encrypted data corresponding to an item file; a drawing file; and encrypted data obtained by encrypting the item file;
a memory unit configured to store the integrated file; and
an arithmetic unit configured to: (a) compare the item file with data obtained by decrypting the encrypted data; and (b) combine and display the item file and the drawing file on the operation screen according to a result of comparison performed in (a),
wherein the arithmetic unit is further configured to run an editing tool for editing the integrated file, and
the operating unit is further configured to receive an install key when the editing tool is activated for first time, and the install key is changed every few seconds or daily.

14. The processing system of claim 13, wherein the arithmetic unit is further configured to display the item file and the drawing file on the operation screen only when an operator with a permission to edit the integrated file is logged in.

15. The processing system of claim 1, wherein the install key is obtained by entering a request key displayed on the operation screen when the editing tool is activated for first time into a predetermined input field of a predetermined web site.

* * * * *